United States Patent Office 3,134,774
Patented May 26, 1964

3,134,774
HETEROCYCLIC CARBOXYLIC ACID DERIVATIVES OF 7-AMINOCEPHALOSPORANIC ACID COMPOUNDS
Alfred W. Chow, Merchantville, N.J., and John R. E. Hoover, Glenside, Pa., assignors to Smith Kline & French Laboratories, Philadelphia, Pa., a corporation of Pennsylvania
No Drawing. Filed Sept. 21, 1962, Ser. No. 225,381
17 Claims. (Cl. 260—243)

This application is a continuation-in-part of our copending application Serial No. 97,749, filed March 23, 1961, now abandoned, which in turn is a continuation-inpart of Serial No. 62,333, filed October 13, 1960, now abandoned.

The invention described in this application pertains to novel compounds possessing valuable chemotherapeutic activity and more specifically to a new class of compounds demonstrating important antimicrobial properties.

More particularly the compounds of this invention demonstrate a high level of antimicrobial activity against such organisms as *Micrococcus pyogenes, Proteus vulgaris* and *Diplococcus pneumoniae.* In addition, these compounds show certain other properties such as prolonged stability, high serum titers and a low incidence of side effects.

Certain of these compounds, furthermore, demonstrate antimicrobial activity against certain micro-organisms which have shown resistance to the known penicillins as for example certain penicillin resistant strains of *Staphylococcus aureus.*

Our compounds are accordingly useful in the treatment of various microbial infections, providing a safe and effective therapy with minimum, if any, associated side effects. The administration of these compounds to the infected host may be accomplished in any of the usual forms, such as for example, solutions, suspensions, creams, ointments, tablets, capsules, and the like, and are suitable for oral, injectable, or topical application, depending upon the nature of the particular infection.

The compounds of the present invention may be represented by the following structural formula:

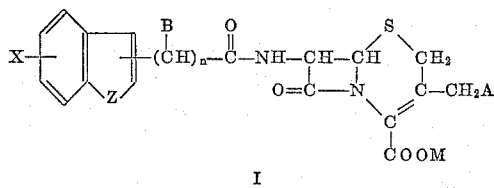

I wherein A is hydrogen, lower alkanoyloxy, hydroxyl, benzoyloxy, pyridinium, or when taken together with M, a monovalent carbon-oxygen bond; M is hydrogen, a pharmaceutically acceptable nontoxic cation, an anionic charge when A is pyridinium, or when taken together with A a monovalent carbon-oxygen bond; B is hydrogen or methyl, X is hydrogen, halogeno, lower alkyl, lower alkoxy, or trifluoromethyl; Z is a group VI atom of an atomic weight less than 33 such as oxygen or sulfur; and $n$ is an integer from 0 to 1 inclusively.

In those instances where A is pyridinium, the cationic charge on this group is matched by the anionic charge of the carboxylic acid radical, the entire molecule being of a Zwitterionic nature and M thus being an anionic charge. A may also be hydroxyl or the lower alkanoic acid of from 1 to 6 carbon atoms an benzoic acid esters thereof. The hydroxyl group embraced by A can also be internally esterified with the carboxylic acid radical, thereby forming a lactone ring as represented when A and M taken together comprise a monovalent carbon-oxygen bond.

Also embraced within the scope of the present invention are the nontoxic pharmaceutically acceptable salts of the above carboxylic acid radical. The cations comprised in these salts and embraced by M include for example, the alkali metal ions as for instance the sodium ion, potassium ion, calcium ion as well as the organic amine cations, such as the lower alkyl ammonium groups, as for instance triethylammonium, procaine, dibenzylamine, 1-ephenamine, dehydroabietylamine and the like.

The compounds of our invention are thus thianaphthenecarboxylic and benzofurancarboxylic acid derivatives of certain aminoheterocyclic nuclei and are prepared by treating a compound of the formula:

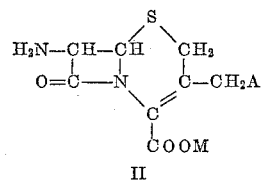

II with a mixed anhydride or acid chloride of the appropriate thianaphthenecarboxylic acid or benzofurancarboxylic acid. The requisite mixed anhydride is obtained, for example, by treating a thianaphthenecarboxylic acid or benzofurancarboxylic acid with a lower alkyl chloroformate as for example, ethyl chloroformate. These reactions may be represented as follows:

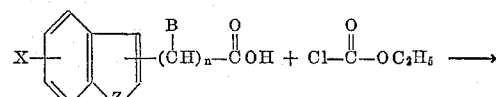

III

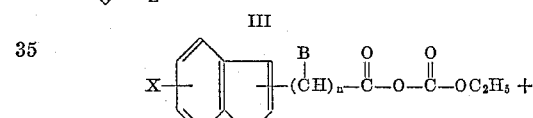

IV

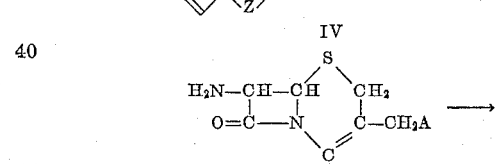

II

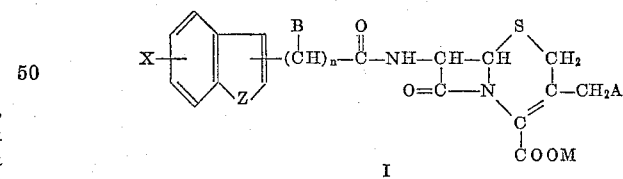

I

Alternatively the equivalent acid chloride of III may be employed for the esterification.

The starting materials whose structures are represented by Formula II include for example 7-aminocephalosporanic acid and related derivatives of 7-aminocephalosporanic acid. This heterocyclic compound, 7-aminocephalosporanic acid, can be prepared from the antibiotic substance Cephalosporin C whose physical and antimicrobial properties are known to the art and whose structure is represented by the structural formula:

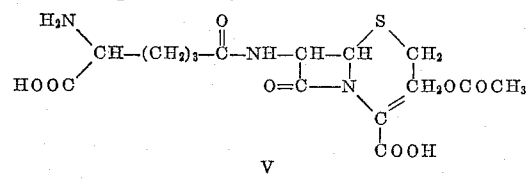

V

Upon hydrolysis of Cephalosporin C, as for example by acidic or enzymatic hydrolysis, there is formed α-aminoadipic acid and 7-aminocephalosporanic acid whose structure may be represented by the formula:

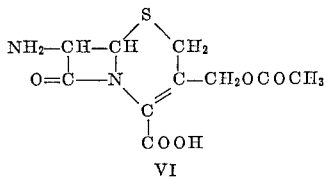
VI

In addition to the formation of 7-aminocephalosporanic acid upon the acid hydrolysis of Cephalosporin C, there is also further formed by hydrolysis of the acetyloxy grouping and subsequent internal esterification, the lactone having the formula:

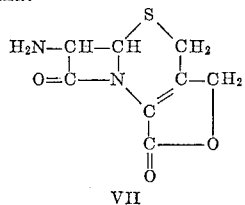
VII

These two products designated by Formula VI and Formula VII are readily separated by virtue of the different physical properties, as for example, by chromatographic techniques.

We have found it further possible to modify the structure of 7-aminocephalosporanic acid by enzymatic cleavage of the acetyloxy grouping without subsequent lactone formations. There is thus formed the compound 3-hydroxymethyl-7-aminodecephalosporanic acid represented by the formula:

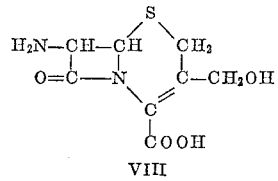
VIII

The designation decephalosporanic acid is herein employed for purposes of nomenclature only and intended to represent the basic heterocyclic acid nucleus having the formula:

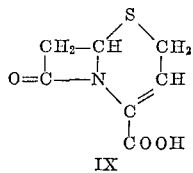
IX

This cleavage of the acetyloxy grouping to form 3-hydroxymethyl-7-aminodecephalosporanic acid without subsequent lactone formations may be accomplished by employing enzymatic means, as for example, by the action of an acetylesterase. Such suitable enzyme preparations may be obtained for example, from citrus fruits such as oranges, grapefruit, lemons and the like, as described by Jansen et al., Arch. Biochem., 15, 415 (1947). Preparations of such an enzyme advantageously effect hydrolysis of the acetyloxy side chain without subsequent lactone formation. The resultant hydroxy group may then be further modified as by re-esterification with a lower alkanoic acid radical or aryl radical such as a benzoic acid radical so as to form the lower alkanoate esters homologous to the acetate ester present in the naturally occurring Cephalosporin C or the corresponding aryl ester, e.g., benzoate ester.

As the conditions and reagents employed in acylating hydroxyl groups are similar to those for acylating amino groups, it is generally desirable in practice to affect acylation of the hydroxymethyl group in the 3-position of decephalosporanic acid, after formation of the carboxyamido group in the 7-position. Deacetylation on either Cephalosporin C or 7-aminocephalosporanic acid according to the enzymatic technique discussed herein followed by reacylation of the resultant hydroxyl group generally results in the undesired concurrent acylation of the amino group of the α-aminoadipic acid side chain of Cephalosporin C or of the amino group in the 7-position of 7-aminocephalosporanic acid respectively. Thus advantageously, Cephalosporin C is cleaved by acid hydrolysis as herein described to yield 7-aminocephalosporanic acid which in turn is subjected to the procedure of this invention to obtain the 7-carboxyamido derivative of cephalosporanic acid. This compound may then be treated with acetylesterase as herein described to yield the corresponding compound containing a hydroxymethyl group in the 3-position which in turn is reacylated by methods analogous to those known to the art, such as for example, by means of an acyl halide or acid anhydride.

Treatment of Cephalosporin C with a tertiary base such as for example, pyridine (including the substituted derivatives thereof such as 2,6-dimethylpyridine), quinoline, or collidine prior to acid hydrolytic cleavage of the aminoadipic acid side chain forms a quaternary salt derivative of Cephalosporin C which when hydrolyzed yields a nucleus which, in the case of pyridine, has been assigned the name, 3-pyridiniummethyl-7-aminodecephalosporanic acid inner salt and the structure:

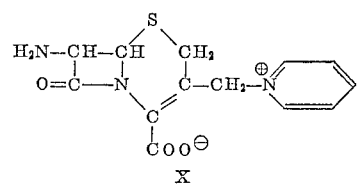
X

Catalytic reduction of Cephalosporin C with palladium on carbon followed by acidic hydrolysis as herein described yields the nucleus 3-methyl-7-amino-decephalosporanic acid which when allowed to react with the acid chloride or mixed anhydrides of the benzofuran carboxylic acids and thianaphthene carboxylic acids employed in this invention yields the corresponding 3-methyl substituted 7-carboxyamidodecephalosporanic acids. These reactions may be exemplified as follows:

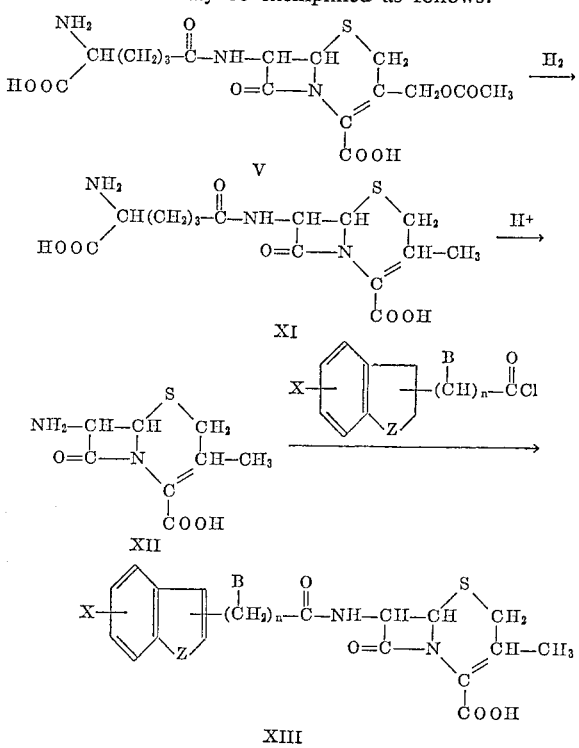

The reduction of Cephalosporin C and the subsequent hydrolysis as well as the compounds XI and XII (3-methyl-7-aminodecephalosporanic acid) are specifically disclaimed from the scope of our present invention.

Several of the requisite thianaphthenecarboxylic acids and benzofurancarboxylic acids employed as starting materials are readily available. Those which are not can be prepared from the appropriate thianaphthene by methods analogous to those known in the art and described below.

The following examples will serve to further typify the nature of our invention; however these examples should not be construed as restricting the scope of this invention.

*Example 1*

The following represents suitable processes for the preparation of the thianaphthene carboxylic acid starting materials.

(A) to 1.8 l. of carbon disulfide are added 270 g. (2.02 moles) of anhydrous aluminum chloride. The suspension is cooled to 5° C. and a mixture of 210 g. (1.57 mole) of thianaphthene, 107 g. (1.36 mole) of acetyl chloride and 200 ml. of carbon disulfide are added in a dropwise fashion and at such a rate so as to maintain a temperature below 10°. Upon completion of the addition, the reaction mixture is allowed to stand for 2 hours and 10% hydrochloric acid is then added to decompose the reaction mixture. The layers which form are next separated. The aqueous layer is extracted three times with ether and these ethereal extracts then combined with the organic layer. This solution is dried over magnesium sulfate, the solvents removed in vacuo and the residue so obtained subjected to fractional distillation, obtaining 3-acetylthianaphthene at a boiling point of 135–137°/3 mm.

A solution of 34 g. (0.825 mole) of sodium hydroxide in 280 ml. of water is cooled to 0° C. and to the solution is added 48.0 (154 ml., 0.3 mole) of bromine in a dropwise fashion at such a rate so as to maintain a temperature below 10°. The solution is again cooled to 0° and 17.6 g. (0.1 mole) of 3-acetylthianaphthene is added dropwise, maintaining a temperature of 0°. Upon decolorization of the reaction mixture, stirring is continued for 3 hours. At the end of this time the reaction mixture is steam distilled to remove the bromoform and carbon tetrabromide. The residue is then cooled to 50° and acidified by the addition of 40 ml. of concentrated sulfuric acid. The solid which thus forms is collected by filtration, washed with water and recrystallized from hexane to yield thianaphthene-3-carboxylic acid.

Similarly there is obtained by employing 4-bromothianaphthene, 7-bromothianaphthene, 5-chlorothianaphthene and 6-chlorothianaphthene in the procedure of this example, the correspondingly substituted thianaphthene-3-carboxylic acids.

In a similar fashion equivalent amounts of the following thianaphthenes are subjected to the procedures of this example: 6-methylthianaphthene, 5-methoxythianaphthene 5-ethylthianaphthene, 5-butylthianaphthene, and 5-trifluoromethylthianaphthene. There are thus respectively obtained 6-methylthianaphthene-3-carboxylic acid, 5-ethylthianaphthene-3-carboxylic acid, 5-butylthianaphthene-3-carboxylic acid and 5-trifluoromethylthianaphthene-3-carboxylic acid.

(B) To a boiling solution of 152.5 g. (1 mole) of 2-chlorobenzaldehyde in 700 ml. of ethanol is added in a dropwise fashion with stirring a fused mixture of 120 g. of sodium sulfide and 16 g. of sulfur over a 2 hour period. The mixture is then cooled and combined with a solution of 60 g. of potassium hydroxide and 60 g. of sodium sulfide in 300 ml. of water. The mixture is heated for 15 minutes and brought to a boil. To this mixture is then added with stirring a solution of 140 g. of chloroacetic acid in 250 ml. of water which has been neutralized by the addition of sodium bicarbonate. The mixture is allowed to stand for 15 hours at the end of which time a crystalline mass forms. This solid is collected by filtration and dissolved in dilute aqueous sodium hydroxide solution. Upon acidification a solid forms which is collected by filtration, dried and recrystallized from hexane to yield thianaphthene-2-carboxylic acid.

In a similar fashion, equivalent amounts of the following-substituted benzaldehydes are employed in place of 2-chlorobenzaldehyde: 2-chloro-4-methylbenzaldehyde, 2-chloro-4-methoxybenzaldehyde and 2-chloro-4-ethoxybenzaldehyde. There are thus respectively obtained the compounds 6-methylthianaphthene-2-carboxylic acid, 6-methoxythianaphthene-2-carboxylic acid and 6-ethoxythianaphthene-2-carboxylic acid.

(C) A chilled solution of 29.5 g. (0.217 mole) of N-butylbromide in 40 ml. of anhydrous ether is added in a dropwise fashion to a chilled suspension of 3.6 g. (0.535 mole) of finely cut lithium wire in 70 ml. of anhydrous ether. The reaction mixture is cooled in an ice bath during the addition and upon completion of the addition, is refluxed for 1 hour with stirring. The reaction mixture is then filtered and cooled in an ice bath. There are next added 19.3 g. (0.144 mole) of thianaphthene in 30 ml. of anhydrous ether. Upon completion of the addition, the mixture is refluxed for 45 minutes.

To this ethereal solution of thianaphthene lithium are slowly added 225 g. (5.0 moles) of acetaldehyde in 500 ml. of chilled anhydrous ether. The mixture is heated at reflux temperature for 1 hour and at the end of this time, poured into 5 l. of ice water which has been saturated with ammonium chloride. The organic layer is then separated and the aqueous layer extracted three times with ether. The combined organic layers are dried over sodium carbonate and distilled in vacuo to yield 1-(2-thianaphthenyl)-ethanol.

A mixture of 35.6 g. (0.20 mole) of 1-(2-thianaphthenyl)-ethanol and 29.7 g. (0.25 mole) of thionyl chloride are refluxed for 1½ hours. The mixture is then distilled and recrystallized from hexane to yield 2-(α-chloroethyl)-thianaphthene.

A mixture of 14.9 g (0.076 mole) of 2-(α-chloroethyl)-thianaphthene, 7.8 g. (0.12 mole) of potassium cyanide, 125 ml. of dioxane and 65 ml. of water is stirred at reflux for 3 hours. The mixture is then cooled, additional water is added and the organic layer separated. The aqueous layer is then extracted 3 times with benzene and these benzene extracts are then combined with the organic layer. The combined organic solutions are then washed, dried and the solvents are then removed under reduced pressure and the residue distilled in vacuo to yield 2-(α-cyanoethyl)-thianaphthene.

A mixture of 14.9 g. (0.08 mole) of 2-(α-cyanoethyl)-thianaphthene, 10 g. of sodium hydroxide (0.25 mole), 50 ml. of water and 50 ml. of ethanol is refluxed for 18 hours. The mixture is then cooled and approximately 17 ml. of concentrated hydrochloric acid is slowly added until the mixture is only weakly basic. The mixture is then filtered and the filtrate boiled to remove excess ethanol. Water is then added and the aqueous basic solution washed with ether. The washed solution is next clarified with charcoal, filtered, and the filtrate acidified. The solid which thus forms is collected by filtration, dried and recrystallized from carbon tetrachloride to yield α-(2-thianaphthenyl)-propionic acid.

In a similar fashion by employing formaldehyde in place of acetaldehyde there is obtained 2-thianaphthenylacetic acid.

(D) A stream of hydrogen chloride is passed through a solution of 372 g. (4.6 moles) of 37% aqueous formaldehyde, 153 ml. (4.2 moles) of concentrated hydrochloric acid and 500 g. of thianaphthene until the solution is saturated with hydrogen chloride. During this time the temperature rises to approximately 85° C. and is maintained at this level for 1 hour while the slow bubbling of hydrogen chloride is continued. At the end of this time, the mixture is cooled and poured into 350 ml. of ice water. The mixture is then extracted with benzene extracts washed with water, 10% aqueous sodium bicarbonate solution and finally with water again. This washed benzene solution is next dried and the solvents removed under reduced pressure. The residue is distilled in vacuo to yield 3-chloromethylthianaphthene.

By substituting an equivalent amount of acetaldehyde for formaldehyde in the foregoing procedure, there is obtained the compound 3-($\alpha$-chloroethyl)-thianaphthene.

3-chloromethylthianaphthene (13.9 g., 0.076 mole) is combined with 7.8 g. (0.12 mole) of potassium cyanide, 125 ml. of dioxane and 65 ml. of water. This mixture is stirred at reflux for 3 hours and at the end of this time is cooled. The organic layer is separated and the aqueous layer extracted three times with benzene. These benzene extracts are then combined with the organic layer and the combined organic solution then washed with water, dried and the solvents removed under reduced pressure. The residue is distilled in vacuo to yield 3-cyanomethyl-thianaphthene.

A mixture of 13.7 g. (0.08 mole) of 3-cyanomethyl-thianaphthene, 10 g. of sodium hydroxide (0.25 mole), 50 ml. of water and 50 ml. of ethanol are refluxed for 18 hours. The mixture is then cooled and approximately 17 ml. of concentrated hydrochloric acid is slowly added until the mixture is only weakly basic. The mixture is then filtered and the filtrate boiled to remove excess ethanol. Water is then added to the aqueous basic solution and this dilute solution then washed with ether and clarified with charcoal. After filtering, the filtrate is acidified and the solid which thus forms again collected by filtration, dried and recrystallized from carbon tetrachloride to yield (3-thianaphthenyl)-acetic acid.

By employing 3-($\alpha$-chloroethyl)-thianaphthene, there is obtained according to this procedure the comopund $\alpha$-(3-thianaphthenyl)-propionic acid.

*Example 2*

Four grams of Cephalosporin C as the sodium salt are dissolved in 60 ml. of water and the pH adjusted to 2.5 by the addition of the acid form of Dowex 50 (X8). The resin is filtered and washed with 20 ml. of water and to the combined filtrate and washings are added 20.5 ml. of 0.1 N hydrochloric acid. The mixture is allowed to stand for 72 hours at 20° C. and at the end of this time, introduced onto a column of Dowex-1 (as the acetate form), 2 cm. x 10 cm. The initial percolate is collected in 10 ml. fractions and upon the collection of the 12th fraction the column is eluted with water until a total of 34 fractions have been collected. The column is thereupon eluted with 0.5 N acetic acid and an additional 65 fractions collected.

Fractions 36 through 45 are combined and concentrated by freeze drying to yield 7-aminocephalosporanic acid.

Fractions 2 through 16 are combined and concentrated in vacuo to yield the lactone of desacetyl Cephalosporin C which when resubjected to the above acid hydrolysis procedure yields 3-hydroxymethyl-7-aminocephalosporanic acid lactone.

By increasing the concentration of the acid in the above procedure from 0.1 N to 1.0 N and the length of reaction to four days the amounts of desacetyl cephalosporanic acid lactone are increased.

*Example 3*

(A) One gram of Cephalosporin C as the sodium salt is dissolved in 50 ml. of water. There is then added sufficient Dowex 50 (X8) resin as the hydrogen form to adjust the pH to 2.6. The resin is removed by filtration and to the filtrate is added 3.8 ml. of pyridine, the pH rising to approximately 6.5. The solution is maintained in a glass container at 37° C. for 48 hours. At the end of this time, the solution is freeze dried and the residue, triturated twice with 50 ml. of acetone and redried. The solid is then dissolved in 10 ml. of water and introduced onto a Dowex 1 (X10) acetate column (2 cm. x 10 cm.). The column is eluted with water and 10 ml. fractions are collected. Fractions 2 through 4 are then combined and freeze dried, and the residue stirred with acetone and dried to yield the pyridinium inner salt of desacetyl Cephalosporin C.

(B) This material is then subjected to the acidic hydrolytic procedure as described in Example 2. Upon chromatographic separation as described therein, the earlier fractions collected are combined and evaporated to a residue to yield 3-pyridiniummethyl-7-aminodecephalosporanic acid inner salt. The latter fractions are combined and concentrated to a residue to yield the pyridinium inner salt of desacetyl Cephalosporin C which may be resubjected to the hydrolytic procedure to yield additional material.

*Example 4*

A solution of 1.52 g. (0.086 mole) of thianaphthene-3-carboxylic acid in 20 ml. of acetone is cooled in an ice bath to 0°. To the cooled solution is added 1.02 g. (0.01 mole) of triethylamine in 10 ml. of acetone. The temperature of the reaction mixture is maintained at 0° and a solution of 1.25 g. (0.011 mole) of ethylchloroformate in 4.5 ml. of acetone is added in a dropwise fashion with stirring. The reaction mixture is stirred for 30 minutes and allowed to gradually attain room temperature after which time it is filtered. The filtrate thus obtained is added slowly to a stirred solution of 2.72 g. (0.01 mole) of 7-aminocephalosporanic acid in 90 ml. of 3% aqueous sodium bicarbonate solution and 50 ml. of acetone. Upon completion of the addition, the mixture is allowed to attain room temperature and stirring continued for an additional one-half hour. The mixture is then extracted three times with portions of 30 ml. of ether and the resultant aqueous solution then adjusted to pH 2.5 by the addition of concentrated sulfuric acid. During this adjustment the temperature is maintained at a level below 10°. Upon reaching pH 2.5 the solution is extracted with 25 ml. of butyl acetate followed by two additional extractions of 10 ml. The butyl acetate extracts are washed once with water and then an additional 25 ml. of water are added and the pH adjusted to 8.0 by the addition of solid potassium bicarbonate with agitation. The aqueous layer is separated, filtered and adjusted to pH 2.0 by the addition of concentrated sulfuric acid at a temperature below 10°. The resultant acidic aqueous mixture is in turn extracted twice with 20 ml. of butyl acetate, washed once with water and dried over sodium sulfate. To the dried butyl acetate solution is added with vigorous stirring a solution of potassium hydride in n-butanol (40 g./l.) until the pH of the reaction mixture is 8.4. The mixture is cooled until crystallization occurs and the crystals so formed are collected by centrifugation, washed with a small amount of acetone and dried. The dried crystals are dissolved in a minimum quantity of 9:1 acetone-water and precipitated by the addition of anhydrous acetone. These crystals are collected and dried to yield 7-[(3-thianaphthenyl)-carboxyamido]-cephalosporanic acid as the potassium salt.

Treatment of an aqueous solution of the potassium salt with hydrogen chloride and extractions with ether then yields the free acid 7-[(3-thianaphthenyl)-carboxyamido]-cephalosporanic acid.

In a similar manner by substituting an equivalent amount of thianaphthene-2-carboxylic acid for thianaphthene-3-carboxylic acid in the procedure of this example and executing the procedures described herein, there is obtained the compound 7-[(2-thianaphthenyl)-carboxyamido]-cephalosporanic acid.

Likewise by employing equivalent amounts of $\alpha$-(2-thianaphthenyl)-propionic acid, $\alpha$-(3-thianaphthenyl)-propionic acid, (2-thianaphthenyl)-acetic acid and 3-thianaphthenyl acetic acid, there are obtained upon execution of the steps described in this example the compounds 7-[α-(2-thianaphthenyl)-propionamido]-cephalosporanic acid, 7-[(2-thianaphthenyl)-acetamido]-cephalosporanic acid, and 7-[(3-thianaphthenyl)-acetamido]-cephalosporanic acid. Similarly the various other substituted thianaphthene acids whose preparation is described in Example 1 may be employed herein to obtain the corresponding 7-carboxyamido derivative of cephalosporanic acid.

*Example 5*

3-hydroxymethyl-7-aminodecephalosporanic acid lactone (2.28 g.) is reacted with the ethyl formate mixed anhydride of thianaphthene-3-carboxylic acid according to the initial procedures of Example 4. The reaction mixture is extracted with butyl acetate and these organic extracts then concentrated to a residue comprising 3-hydroxymethyl - 7 - [(3 - thianaphthenyl) - carboxyamido]-decephalosporanic acid lactone which is further purified by recrystallization from ether.

In a similar manner the other thianaphthenecarboxylic acids described herein may be employed in place of thianaphthene-3-carboxylic acid to obtain the corresponding 7-carboxyamido derivatives of 3-hydroxymethyldecephalosporanic acid lactone.

*Example 6*

In an analogous fashion, equivalent amounts of 3-pyridiniummethyl-7-aminodecephalosporanic acid inner salt are employed in place of 7-aminocephalosporanic acid in the procedure of Example 4 and it is thus obtained upon completion of the steps therein described the compound 3 - pyridiniummethyl - 7 - [(3 - thianaphthenyl) - carboxyamido]-decephalosporanic acid inner salt.

*Example 7*

A preparation of acetylesterase obtained from the peels of 72 oranges according to the procedure of Jansen et al., Arch. Biochem., 15 415 (1947) is added to 1 g. of 7-(3-thianaphthenylcarboxyamido)-cephalosporanic acid dissolved in 15 ml. of water. The pH is adjusted to 6 and maintained at or above this level for 15 hours. At the end of this time, the solution is passed through an IR 4B column (in the acetate form) and eluted with aqueous 0.1 M acetic acid which has been adjusted to pH 5.5 by the addition of pyridine. The solutions collected by development of the column are adjusted to pH 8 by the addition of sodium hydroxide and this alkaline mixture is evaporated in vacuo to yield 3-hydroxymethyl-7-(3-thianaphthenylcarboxyamido)-decephalosporanic acid as the sodium salt.

To 1 g. of 3-hydroxymethyl-7-(3-thianaphthenylcarboxyamido)-decephalosporanic acid in 10 ml. of collidine are added 15 ml. of propionyl chloride. The mixture is allowed to stand for 10 hours and at the end of this time poured into 25 ml. of ice water. The solid which is thus formed is collected by filtration, recrystallized from dimethylformamide and dried to yield 3-propionyloxymethyl - 7 - [(3 - thianaphthenyl) - carboxyamido]-decephalosporanic acid. In a similar fashion other lower alkanoyl chlorides such as butanoyl chloride or pentanoyl chloride may be employed in place of propionyl chloride obtaining the corresponding compounds, 3-butanoyloxymethyl-7-[(3-thianaphthenyl) - carboxyamido]-decephalosporanic acid and 3-pentanoyloxymethyl-7-[(3-thianaphthenyl)-carboxyamido]-decephalosporanic acid.

In an analogous fashion benzoyl chloride is employed in the place of these lower alkanoyl chlorides and it is thus obtained 3-benzoyloxymethyl-7-[(3-thianaphthenyl)-carboxyamido]-decephalosporanic acid.

By substituting 7-[(2-thianaphthenyl)-carboxyamido]-cephalosporanic acid, 7-[α-(2-thianaphthenyl)-propionamido]-cephalosporanic acid and 7-[(3-thianaphthenyl)-carboxyamido]-cephalosporanic acid, there are respectively obtained upon subjecting them to the present example the compounds 3-propionyloxymethyl-7-[(2-thianaphthenyl)-carboxyamido]-decephalosporanic acid, 3-propionyloxymethyl - 7 - [α - (2 - thianaphthenyl) - propionamido]-decephalosporanic acid and 3-propionyloxymethyl - 7 - [(2 - thianaphthenyl) - acetamido] - decephalosporanic acid.

In a similar manner by employing benzoyl chloride, the corresponding benzoate esters of the above compounds are prepared.

*Example 8*

(A) To 500 ml. of anhydrous ether are added 18.6 g. (0.49 mole) of lithium aluminum hydroxide. The mixture is stirred, flushed with nitrogen and to it is added in a dropwise fashion so as to produce a gentle reflux, 48.6 g. (0.31 mole) of benzofuran 3-carboxylic acid. The mixture is then stirred for an additional 1½ hours at room temperature and the excess lithium aluminum hydroxide decomposed by the careful sequential addition of 19 ml. of water, 57 ml. of 10% aqueous sodium hydroxide and finally 57 ml. of water. The resultant mixture is filtered and the solid so obtained mixed with additional water, stirred and again filtered. The filtrates are combined and the layers separated. The aqueous layer is then extracted with ether and the combined organic layer dried over magnesium sulfate and concentrated to an oil under reduced pressure. This oil is then distilled in vacuo to yield 3-hydroxymethylbenzofuran.

To 88.1 g. (0.74 mole) of thionyl chloride is slowly added 45 g. of 3-hydroxymethylbenzofuran with cooling. Upon completion of the addition, the mixture is refluxed at steam bath temperatures for 1½ hours and the excess thionyl chloride removed under reduced pressure. The residue is flushed twice with dried benzene and the solvents removed after each addition under reduced pressure. The residue so obtained is then distilled in vacuo to yield 3-chloromethylbenzofuran.

To 40 ml. of dimethylformamide are added 34.3 g. (0.22 mole) of 3-chloromethylbenzofuran. To this solution is added 20 g. (0.41 mole) of sodium cyanide in 40 ml. of dimethylformamide. The solution is cooled in a water bath until heat is no longer generated. The mixture is then stirred for 15 minutes at room temperature and finally heated at 60° for 2 hours. The mixture is next cooled and filtered and the filtrate concentrated in vacuo. This residue is then distilled to yield 3-cyanomethylbenzofuran.

Two grams of 3-cyanomethylbenzofuran are dissolved in 30 ml. of #30 alcohol. To this solution is then added a solution of 0.6 g. (0.015 mole) of sodium hydroxide in 10 ml. of water. The mixture is gently refluxed for 18 hours, cooled, adjusted to pH 9.3 with concentrated hydrochloric acid and filtered. The filtrate is evaporated to remove the solvents and the residual solution diluted with water to approximately 50 ml. and extracted with two 50 ml. portions of ether. The residual aqueous phase is then decolorized with 0.25 g. of Norite and filtered. Adjustment of the filtrate to pH 2.9 with concentrated hydrochloric acid forms a solid which is collected by filtration and dried to yield (3-benzofuryl)-acetic acid.

(B) To 150 g. of carbon disulfide is added 39.2 g. (0.47 mole) of benzofuran. The mixture is stirred vigorously with cooling and to it is added in a dropwise fashion 75 g. (0.47 mole) of bromine in 150 g. of carbon disulfide. The rate of addition is adjusted so that the temperature does not exceed —5° C. Upon completion of the addition, the solution is filtered and the solid so collected recrystallized from chloroform to yield benzofurandibromide.

A total of 27.8 g. (0.1 mole) of benzofurandibromide is added in several portions to a cooled solution of 12 g. of potassium hydroxide in absolute ethanol. Upon completion of the addition, the mixture is allowed to attain room temperature and is then refluxed with stirring for 2 hours. At the end of this time the mixture is steam distilled and the organic layer is separated from the distillate. The layer is washed once with water and dried over sodium sulfate to yield 3-bromobenzofuran.

A mixture of 19.9 g. (0.1 mole) of 3-bromobenzofuran, 9.8 g. (0.11 mole) of cuprous cyanide and 20 ml. of pyridine is heated for 18 hours at 215–240° C. The reaction mixture is then treated with aqueous ammonium hydroxide and extracted with benzene. The benzene extracts are then evaporated to a residue at steam bath temperature and the residue recrystallized from cyclohexane to yield 3-cyanobenzofuran, M.P. 93°.

To a solution of 25.0 g. of methyl magnesium iodide in anhydrous ether is added 14.5 g. (0.1 mole) of 3-cyanobenzofuran in a dropwise fashion. During the addition, the reaction is controlled as required by cooling. Upon completion of the addition, the mixture is refluxed for 1 hour. The solution is then cooled and an aqueous ammonium chloride solution is added. The reaction mixture is next extracted with ether and the ethereal extracts washed with 10% sulfuric acid and thence with water, after which they are dried over magnesium sulfate. The solvents are evaporated and the residual material distilled to yield 3-benzofurylmethyl ketone.

A solution of 16.2 g. (0.1 mole) of 3-benzofurylmethyl ketone in 20 ml. of anhydrous ether is added dropwise to a suspension of 1.9 g. (0.05 mole) of lithium aluminum hydride in 50 ml. of anhydrous ether. The mixture is then heated at reflux for 30 minutes. There is next cautiously added 2 ml. of water to decompose the reaction mixture and the resultant mixture is filtered. The filtrate is extracted with ether and the ethereal extracts thus obtained dried over magnesium sulfate. Evaporation of the dried ethereal solution and distillation of the residue then yields 3-($\alpha$-hydroxyethyl)-benzofuran.

3-($\alpha$-hydroxyethyl)-benzofuran is treated with thionyl chloride, sodium cyanide, and aqueous sodium hydroxide according to the procedure of Example 8A to yield sequentially the compounds 3-($\alpha$-chloroethyl)-benzofuran, 3-($\alpha$-cyanoethyl)-benzofuran and $\alpha$-(3-benzofuryl)-propionic acid.

In a similar fashion by employing 5-chlorobenzofuran in the procedure of this example and upon execution of the steps herein described, there is ultimately obtained the compound $\alpha$-(5-chloro-3-benzofuryl)-propionic acid. Similarly, 6-methylbenzofuran and 5-methoxybenzofuran when treated in the manner of this example yield the compounds $\alpha$-(6-methyl-3-benzofuryl)-propionic acid and $\alpha$-(5-methoxy-3-benzofuryl)-propionic acid.

(C) One mole of salicylaldehyde (122 g.) is dissolved in 400 ml. of ethanol and refluxed with 56 g. of potassium hydroxide until a solution is obtained. There is then slowly added with stirring 92.5 g. (1 mole) of chloro-acetone. When the reaction has subsided, an equal volume of water is added and the resultant mixture distilled to remove excess ethanol. The residual material is extracted with ether and the ethereal solutions dried over magnesium sulfate. Removal of the solvents under reduced pressure to yield a residue and recrystallization of this residue from ethanol yields 2-acetylbenzofuran.

To a suspension of 19 g. (0.5 mole) of lithium aluminum hydride in 500 ml. of anhydrous ether is added in a dropwise fashion, 160 g. (1 mole) of 2-benzofurylmethyl ketone in 200 ml. of anhydrous ether. This mixture is refluxed for 1 hour and then decomposed by the dropwise sequential addition of 17 ml. of water, 17 ml. of 10% aqueous sodium hydroxide and 57 ml. of water. The precipitated salts are removed from the solution by filtration and the filtrate concentrated to an oil which upon distillation in vacuo affords 2-($\alpha$-hydroxyethyl)-benzofuran.

In an analogous fashion to that described in Example 8A, 2-($\alpha$-hydroxyethyl)-benzofuran is subjected to chlorination, cyanotization and hydrolysis, employing equivalent amounts of the benzofuran compounds throughout. Upon execution of these steps, there is thus obtained the compound $\alpha$-(2-benzofuryl)-propionic acid.

In a similar fashion by employing 5-bromosalicylaldehyde, 4-fluorosalicylaldehyde, 5-methylsalicylaldehyde and 4-methoxysalicylaldehyde, in the procedure of the present example, there are obtained the compounds $\alpha$-(5-bromo-2-benzofuryl)-propionic acid, $\alpha$-(4-fluoro-2-benzofuryl)-propionic acid, $\alpha$-(5-methyl-2-benzofuryl)-propionic acid and $\alpha$-(6-methoxy-2-benzofuryl)-propionic acid.

*Example 9*

Cephalosporin C sodium salt dihydrate (0.75 g.) in sufficient water to effect dissolution is added to an aqueous suspension of 2.0 g. of 10% palladium on carbon in 30 ml. of water which has been previously saturated with hydrogen. The mixture is hydrogenated with agitation at one atmosphere pressure for 1 hour.

The catalyst is removed by centrifugation and the supernatent is preserved. The catalyst is then extracted with 80% aqueous methanol at pH 8, and these extracts then adjusted to pH 6 by the addition of hydrochloric acid. The extract is evaporated to a small volume and added to the original reaction solution. The combined solution is then brought to pH 6 with sodium hydroxide and lyophilized to yield the product as the sodium salt.

The product obtained (0.3 g.) is dissolved in 7 ml. of water containing 0.25 g. of anhydrous sodium bicarbonate. To this stirred solution is added 0.25 g. of 1-fluoro-2,4-dinitrobenzene in 7 ml. of ethyl alcohol. The mixture is stirred in the dark at room temperature for 2½ hours. The pH of the solution is then adjusted to 5 by the addition of concentrated hydrochloric acid and the alcohol is removed under reduced pressure.

The mixture is adjusted to pH 7 by the addition of sodium bicarbonate and extracted with ether to remove excess 1-fluoro-2,4-dinitrobenzene, yielding a clear aqueous solution. The pH is adjusted to 2.5 by the addition of concentrated hydrochloric acid and extracted several times with ethyl acetate. These ethyl acetate extracts are washed with water, dried over anhydrous sodium sulfate and evaporated to a residue.

The solid obtained (1 g.) is dissolved in 10 ml. of acetonitrile and 10 ml. of N-hydrochloric acid. This solution is stored in the dark at 37° under nitrogen for 64 hours.

At the end of this time, 20 ml. of water are added to this solution and the solution then extracted five times with 10 ml. portions of ethyl acetate. The residual solution is then brought to pH 6 with 1 N sodium hydroxide, and added to a column of Dowex-1 (X8) (acetate form, 3 cm. x 5 cm.). When all of the solution has been introduced onto the column, the column is washed with 60 ml. of water and then the product eluted with 2 N acetic acid. Lyophilization of the acetic acid eluate yields the product, 3-methyl-7-aminodecephalosporanic acid as a solid.

*Example 10*

A solution of 13.9 g. (0.086 mole) of benzofuran 3-carboxylic acid in 20 ml. of acetone is cooled in an ice bath to 0°. To the cooled solution is added 1.02 g. (0.01 mole) of triethylamine in 10 ml. of acetone. The temperature of the reaction mixture is maintained at 0° and a solution of 1.25 g. (0.011 mole) of ethylchloroformate in 4.5 ml. of acetone is added in a dropwise fashion with stirring. The reaction mixture is stirred for 30 minutes and allowed to gradually attain room temperature after which time it is filtered. The filtrate thus obtained is added slowly to a stirred solution of 2.72 g. (0.01 mole) of 7-aminocephalosporanic acid in 90 ml. of 3% aqueous sodium bicarbonate solution and 50 ml. of acetone. Upon completion of the addition, the mixture is allowed to attain room temperature and stirring continued for an additional one-half hour. The mixture is then extracted three times with portions of 30 ml. of ether and the resultant aqueous solution then adjusted to pH 2.5 by the addition of concentrated sulfuric acid. During this adjustment the temperature is maintained at a level below 10°. Upon reaching pH 2.5 the solution is extracted with 25 ml. of butyl acetate followed by two additional extractions of 10 ml. The butyl acetate extracts are washed once with water and then an additional 25 ml. of water are added and the pH adjusted to 8.0 by the addition of solid potassium bicarbonate with agitation. The aqueous layer is separated, filtered and adjusted to pH 2.0 by the addition of concentrated sulfuric acid at a temperature below 10°. The resultant acidic aqueous mixture is in turn extracted twice with 20 ml. of butyl acetate, washed once with water and dried over sodium sulfate. To the dried butyl acetate solution is added with vigorous stirring a solution of potassium hydride in n-butanol (40 g./l.) until the pH of the reaction mixture is 8.4. The mixture is cooled until crystallization occurs and the crystals so formed are collected by centrifugation, washed with a small amount of acetone and dried. The dried crystals are dissolved in a minimum quantity of 9:1 acetone-water and precipitated by the addition of anhydrous acetone. These crystals are collected and dried to yield 7-[(3-benzofuryl)-carboxyamido]-cephalosporanic acid as the potassium salt.

Treatment of an aqueous solution of the potassium salt with hydrogen chloride and extracted with ether then yields the free acid 7-[(3-benzofuryl)-carboxyamido]-cephalosporanic acid.

In a similar manner by substituting an equivalent amount of benzofuran 2-carboxylic acid for benzofuran 3-carboxylic acid in the procedure of this example, there is obtained the compound 7-[(2-benzofuryl)-carboxyamido]-cephalosporanic acid.

Likewise by employing equivalent amounts of α-(2-benzofuryl)-propionic acid, α-(3-benzofuryl)-propionic acid, (2-benzofuryl)-acetic acid and (3-benzofuryl)-acetic acid, there are obtained upon execution of the steps described in this example the compounds 7-[α-(2-benzofuryl)-propionamido]-cephalosporanic acid,
7-[α-(3-benzofuryl)-propionamido]-cephalosporanic acid,
7-[(2-benzofuryl)-acetamido]-cephalosporanic acid and
7-[3-benzofuryl)-acetamido]-cephalosporanic acid.

*Example 11*

Benzofuryl 3-carboxylic acid is substituted for thianaphthene-3-carboxylic acid in the procedure of Example 5. Upon completion of the steps therein described, there is obtained the compound 3-hydroxymethyl-7-[(3-benzofuryl)-carboxyamido]-decephalosporanic acid lactone.

*Example 12*

An equivalent quantity of 3-pyridiniummethyl-7-aminodecephalosporanic acid inner salt is employed in place of 7-aminocephalosporanic acid in the procedure of Example 10 and there is thus obtained upon completion of the steps therein described the compound 3-pyridiniummethyl - 7 - [(3 - benzofuryl)-carboxyamino]-decephalosporanic acid inner salt.

*Example 13*

3-methyl-7-aminodecephalosporanic acid (2.34 g.) is substituted for 7-aminocephalosporanic acid in the method of Example 10 and upon completion of the steps therein described, there is obtained the compound 3-methyl-7-(3-benzofurylcarboxyamido)-decephalosporanic acid. There is similarly prepared according to this procedure as described in Example 10 the compounds 3-methyl-7-(2-benzofurylcarboxyamido)-decephalosporanic acid,
3-methyl-7-[α-(2-benzofuryl)-propionamido]-decephalosporanic acid,
3-methyl-7-[α-(3-benzofuryl)-propionamido]-decephalosporanic acid,
3-methyl-7-[(2-benzofuryl)-acetamido]-decephalosporanic acid and
3-methyl-7-[(3-benzofuryl)-acetamido]-decephalosporanic acid.

By employing 3-methyl-7-aminodecephalosporanic acid in the procedure of Example 4, there is similarly formed the compounds 3-methyl-7-(3-thianaphthenylcarboxyamido)-decephalosporanic acid,
7-(2-thianaphthenylcarboxyamido)-decephalosporanic acid,
3-methyl-7-[α-(2-thianaphthenyl)-propionamido]-decephalosporanic acid,
3-methyl-7-[α-(3-thianaphthenyl)-propionamido]-decephalosporanic acid,
3-methyl-7-[(2-thianaphthenyl)-acetamido]-decephalosporanic acid, and
3-methyl-7-[(3-thianaphthenyl)-acetamido]-decephalosporanic acid.

*Example 14*

3 - hydroxymethyl - 7 - (3 - benzofurylcarboxyamido)-decephalosporanic acid is prepared according to the method of Example 7 by substituting 1 g. of 7-(3-benzofurylcarboxyamido)-cephalosporanic acid for 7-(3-thianaphthenylcarboxyamido)-cephalosporanic acid. From the compound so obtained there are prepared according to the method further described in Example 7 the compounds 3-propionyloxymethyl-7-(3-benzofurylcarboxyamido)-decephalosporanic acid,
3-butanoyloxymethyl-7-(3-benzofurylcarboxyamido)-decephalosporanic acid,
3-pentanoyloxymethyl-7-(3-benzofurylcarboxyamido)-decephalosporanic acid and
3-benzoyloxymethyl-7-(3-benzofurylcarboxyamido)-decephalosporanic acid.

*Example 15*

One gram of 7-(2-thianaphthenylcarboxyamido)-cephalosporanic acid is dissolved in excess amyl acetate and to the solution is added 10 g. of N-ethylpiperidine. The solution is stirred for 30 minutes and the crystals formed upon standing are collected by filtration and dried to yield the N-ethylpiperidine salt of 7-(2-thianaphthenylcarboxyamido)-cephalosporanic acid.

*Example 16*

Triethylamine is substituted for N-ethylpiperidine in the procedure of Example 15 and 7-[α-(3-thianaphthenyl)-propionamido]-cephalosporanic acid is in turn substituted for 7-(2-thianaphthenylcarboxyamido)-cephalosporanic acid. There is thus obtained upon the execution of the steps therein described the triethylamine salt of 7-[α-(3-thianaphthenyl)propionamido]-cephalosporanic acid.

We claim:
1. Compounds of the formula

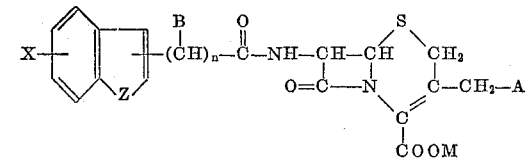

wherein:

A is a member selected from the group consisting of hydrogen, lower alkanoyloxy, hydroxyl, benzoyloxy, pyridinium, and when taken together with M, a monovalent carbon-oxygen bond;

M is a cation selected from the group consisting of hydrogen, sodium, potassium, calcium, and pharmaceutically acceptable nontoxic organic amine cations, an anionic charge when A represents pyridinium, and when taken together with A, a monovalent carbon-oxygen bond;

B is a member selected from the group consisting of hydrogen and methyl;

Z is a member selected from the group consisting of oxygen and sulfur;

X is a member selected from the group consisting of hydrogen, halogeno, lower alkyl, lower alkoxy, and trifluoromethyl; and $n$ is an integer from 0 to 1 inclusively.

2. Compounds of the formula:

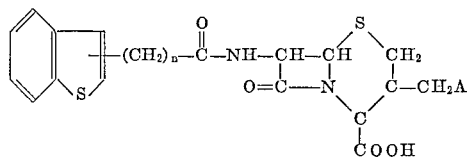

wherein A is lower alkanoyloxy and $n$ is an integer from 0 to 1 inclusively.

3. Compounds of the formula:

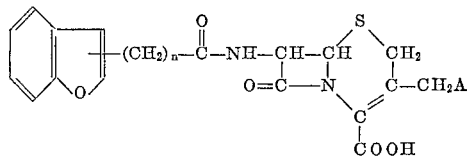

wherein A is lower alkanoyloxy and $n$ is an integer from 0 to 1 inclusively.

4. Compounds of the formula:

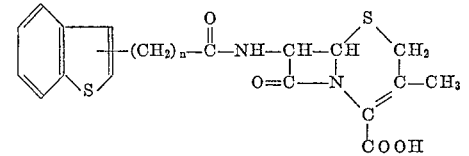

wherein $n$ is an integer from 0 to 1 inclusively.

5. Compounds of the formula:

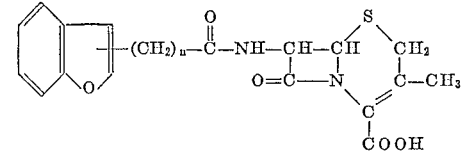

wherein $n$ is an integer from 0 to 1 inclusively.

6. Compounds of the formula:

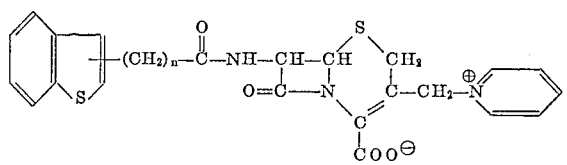

wherein $n$ is an integer from 0 to 1 inclusively.

7. Compounds of the formula:

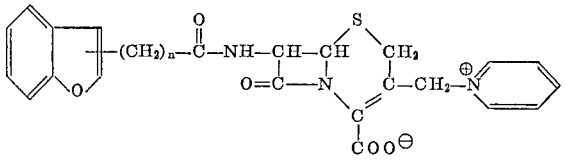

wherein $n$ is an integer from 0 to 1 inclusively.

8. 3-pyridiniummethyl - 7 - [(2 - thianaphthenyl) - carboxyamido]-decephalosporanic acid inner salt.

9. 3 - pyridiniummethyl - 7-[(2 - benzofuryl) - carboxyamido]-decephalosporanic acid inner salt.

10. 3-pyridiniummethyl-7 - [(3 - thianaphthenyl) - carboxyamido]-decephalosporanic acid inner salt.

11. 3-pyridiniummethyl-7 - [(3 - benzofuryl) - carboxyamido]-decephalosporanic acid inner salt.

12. 3-methyl-7-[(2 - thianaphthenyl) - carboxyamido]-decephalosporanic acid.

13. 3-methyl-7-[(3 - thianaphthenyl) - carboxyamido]-decephalosporanic acid.

14. 3 - methyl - 7 - [(2 - benzofuryl) - carboxyamido]-decephalosporanic acid.

15. 3 - methyl - 7 - [(3 - benzofuryl) - carboxyamido]-decephalosporanic acid.

16. 7-[(2-thianaphthenyl)-acetamido]- cephalosporanic acid.

17. 7-[(3-thianaphthenyl)- acetamido]-cephalosporanic acid.

References Cited in the file of this patent

Jour. American Med. Ass., p. 466, May 24, 1958.
Burger: Med. Chem., pp. 46–48 (1960).